US008377156B2

(12) United States Patent
Berry et al.

(10) Patent No.: US 8,377,156 B2
(45) Date of Patent: Feb. 19, 2013

(54) FLUID COOLED REFORMER AND METHOD FOR COOLING A REFORMER

(75) Inventors: Jonathan Dwight Berry, Simpsonville, SC (US); Hasan Karim, Simpsonville, SC (US); Abdul Rafey Khan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/566,545

(22) Filed: Aug. 3, 2012

(65) Prior Publication Data

US 2012/0291352 A1 Nov. 22, 2012

Related U.S. Application Data

(62) Division of application No. 12/749,985, filed on Mar. 30, 2010, now Pat. No. 8,252,251.

(51) Int. Cl.
*C10J 3/46* (2006.01)

(52) U.S. Cl. ........ 48/197 R; 48/61; 48/127.9; 48/127.1; 48/127.5; 48/127.7; 48/198.3; 48/203; 422/611; 422/629; 422/632; 422/633; 422/646; 422/647; 422/649; 422/198

(58) Field of Classification Search ........... 48/61, 127.9, 48/127.1, 127.7, 198.3, 203; 422/198, 611, 422/629, 632, 633, 646, 647
See application file for complete search history.

(56) References Cited

U.S. PATENT DOCUMENTS

| | | | | | |
|---|---|---|---|---|---|
| 2,627,455 | A | * | 2/1953 | Berg | 48/86 R |
| 3,796,547 | A | * | 3/1974 | Muenger | 422/200 |
| 4,650,651 | A | * | 3/1987 | Fuderer | 422/628 |
| 4,741,885 | A | * | 5/1988 | Herbort et al. | 422/625 |
| 5,980,840 | A | * | 11/1999 | Kleefisch et al. | 422/211 |
| 6,083,425 | A | * | 7/2000 | Clawson et al. | 252/372 |
| 6,444,179 | B1 | * | 9/2002 | Sederquist | 422/628 |
| 7,367,996 | B2 | * | 5/2008 | Clawson et al. | 48/61 |
| 7,604,673 | B2 | * | 10/2009 | Kaye et al. | 48/61 |
| 2004/0093797 | A1 | * | 5/2004 | Bingham et al. | 48/198.7 |
| 2005/0000861 | A1 | * | 1/2005 | Clerici et al. | 208/251 R |
| 2006/0230680 | A1 | * | 10/2006 | Rostrup-Nielsen et al. | 48/198.3 |
| 2007/0062117 | A1 | * | 3/2007 | Schingnitz et al. | 48/210 |
| 2009/0031731 | A1 | * | 2/2009 | Ziminsky et al. | 60/777 |

* cited by examiner

*Primary Examiner* — Kaity V. Handal
(74) *Attorney, Agent, or Firm* — Dority & Manning, P.A.

(57) ABSTRACT

The present subject matter is directed to a method for operating a fuel reformer. The method may generally include directing a fluid stream around a reactor assembly of the fuel reformer to cool the reactor assembly, and mixing a heated reformate stream produced by the reactor assembly with the fluid stream to cool the heated reformate stream.

10 Claims, 5 Drawing Sheets

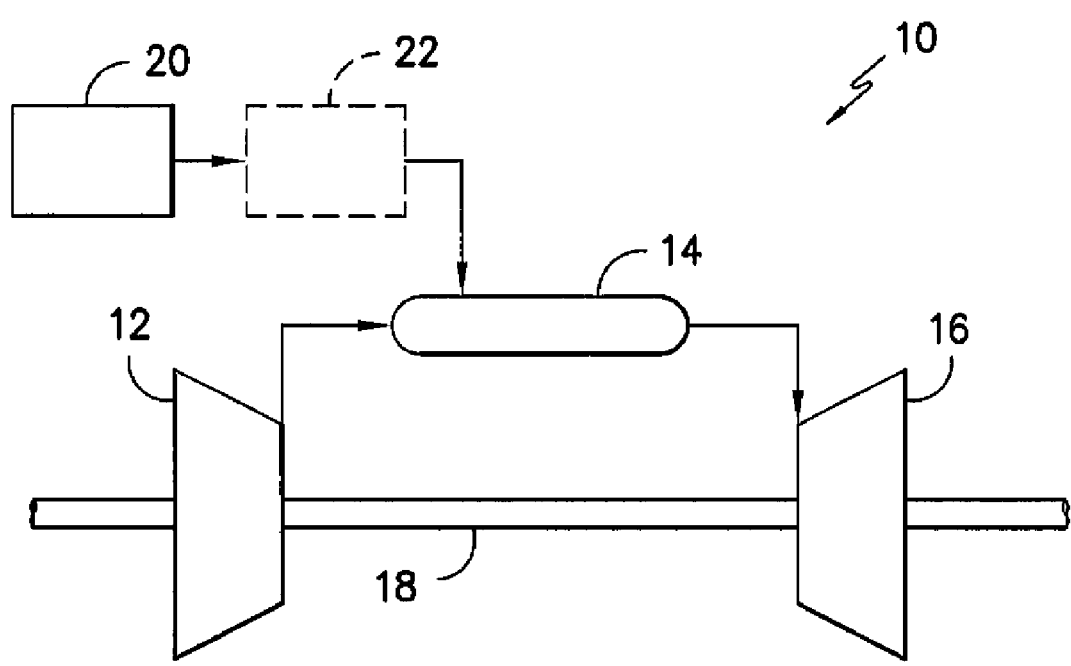
FIG. -1-

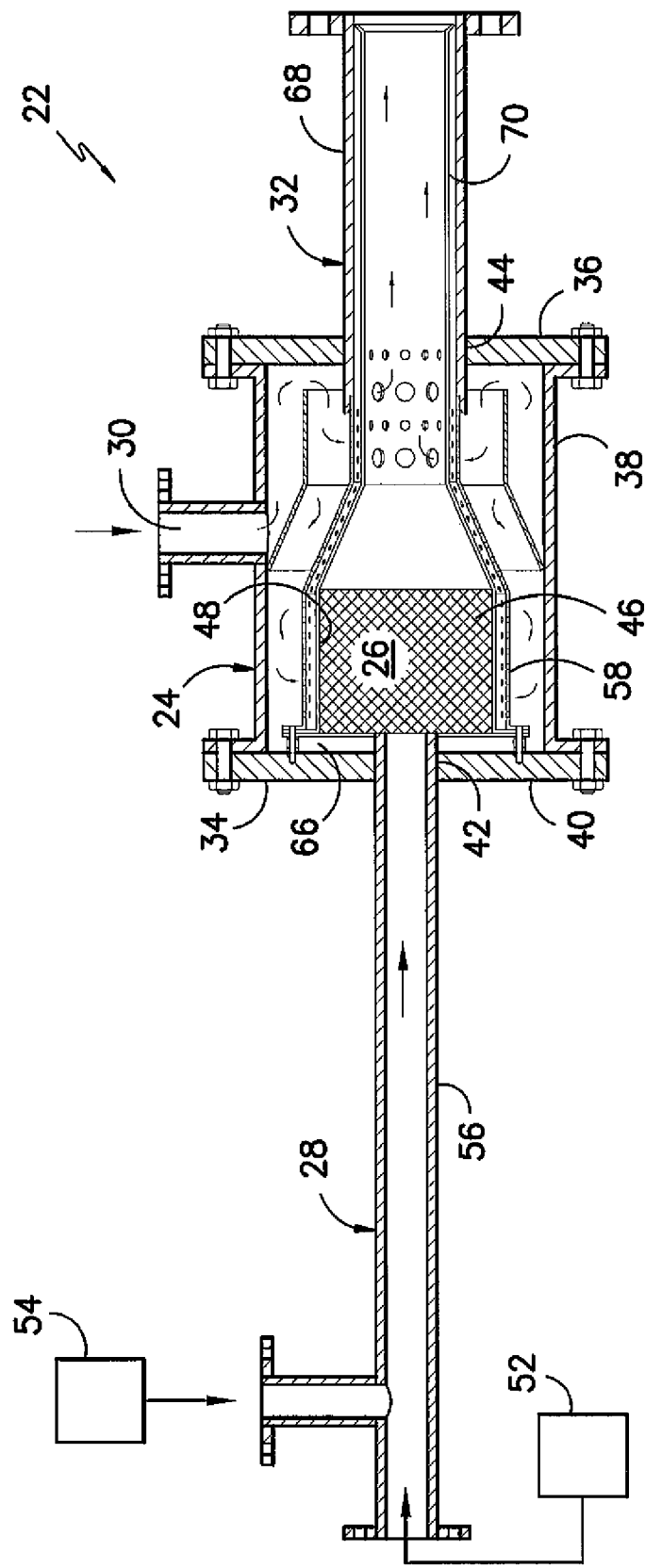
FIG. -2-

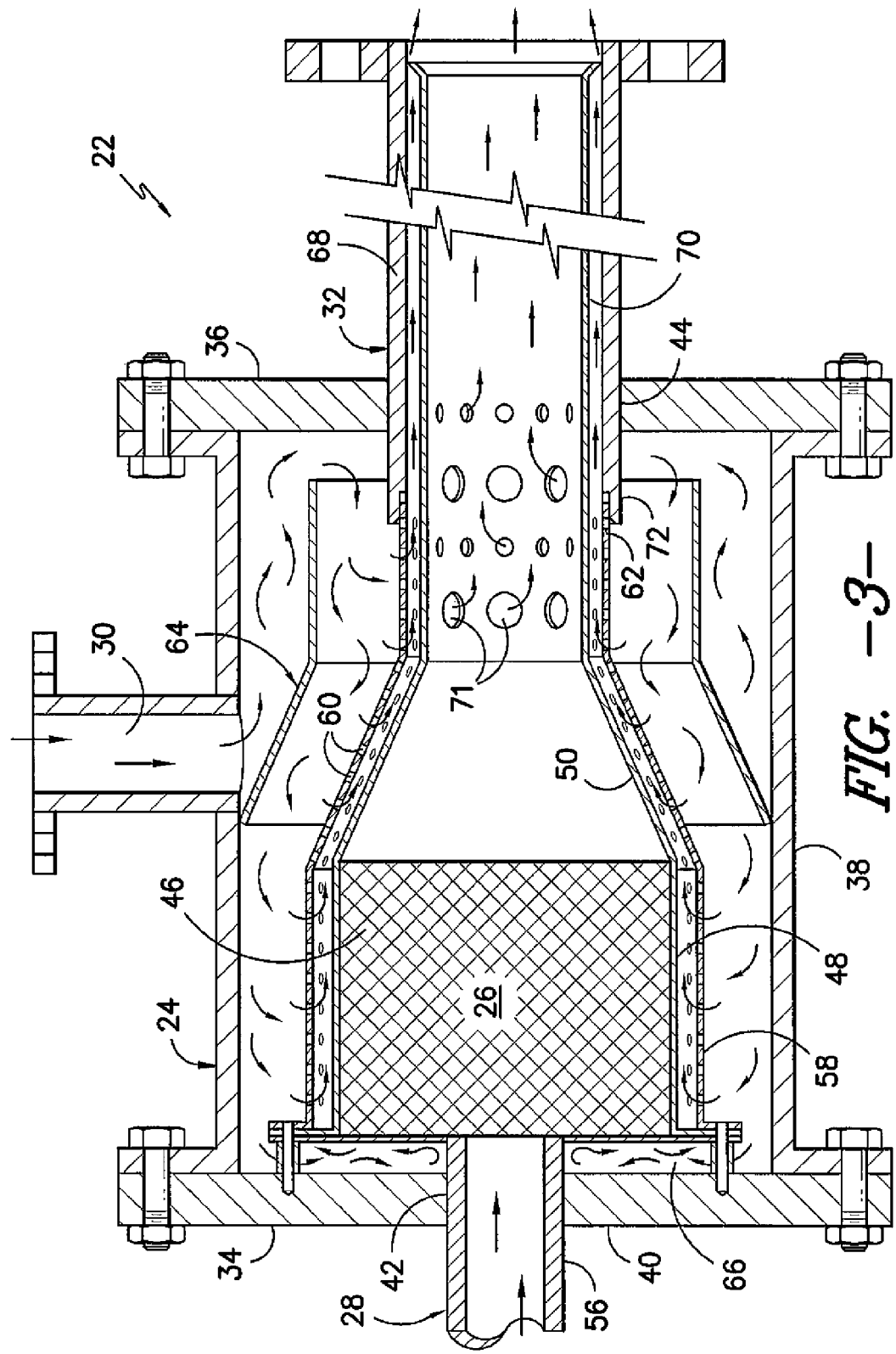
FIG. -3-

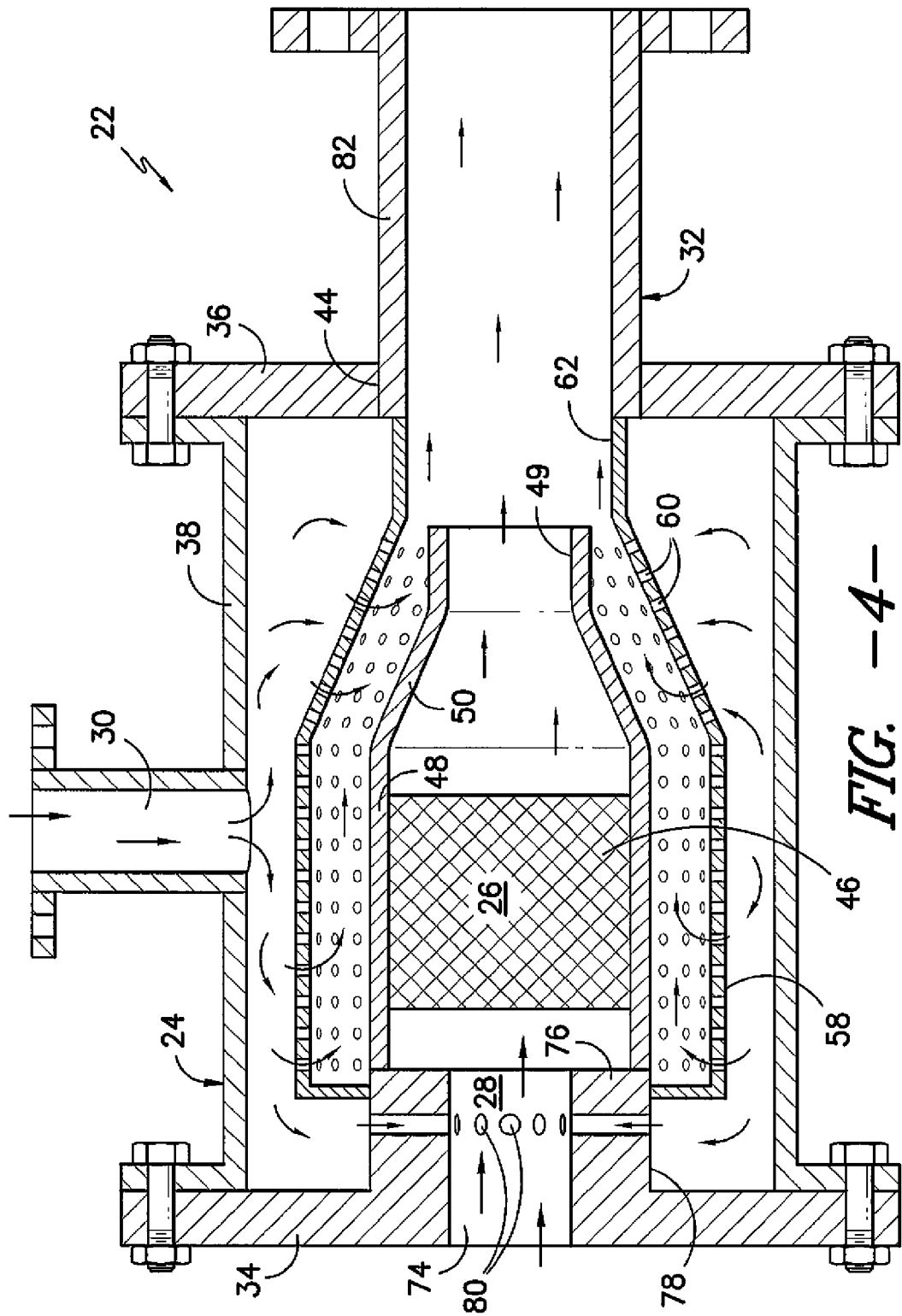
FIG. -4-

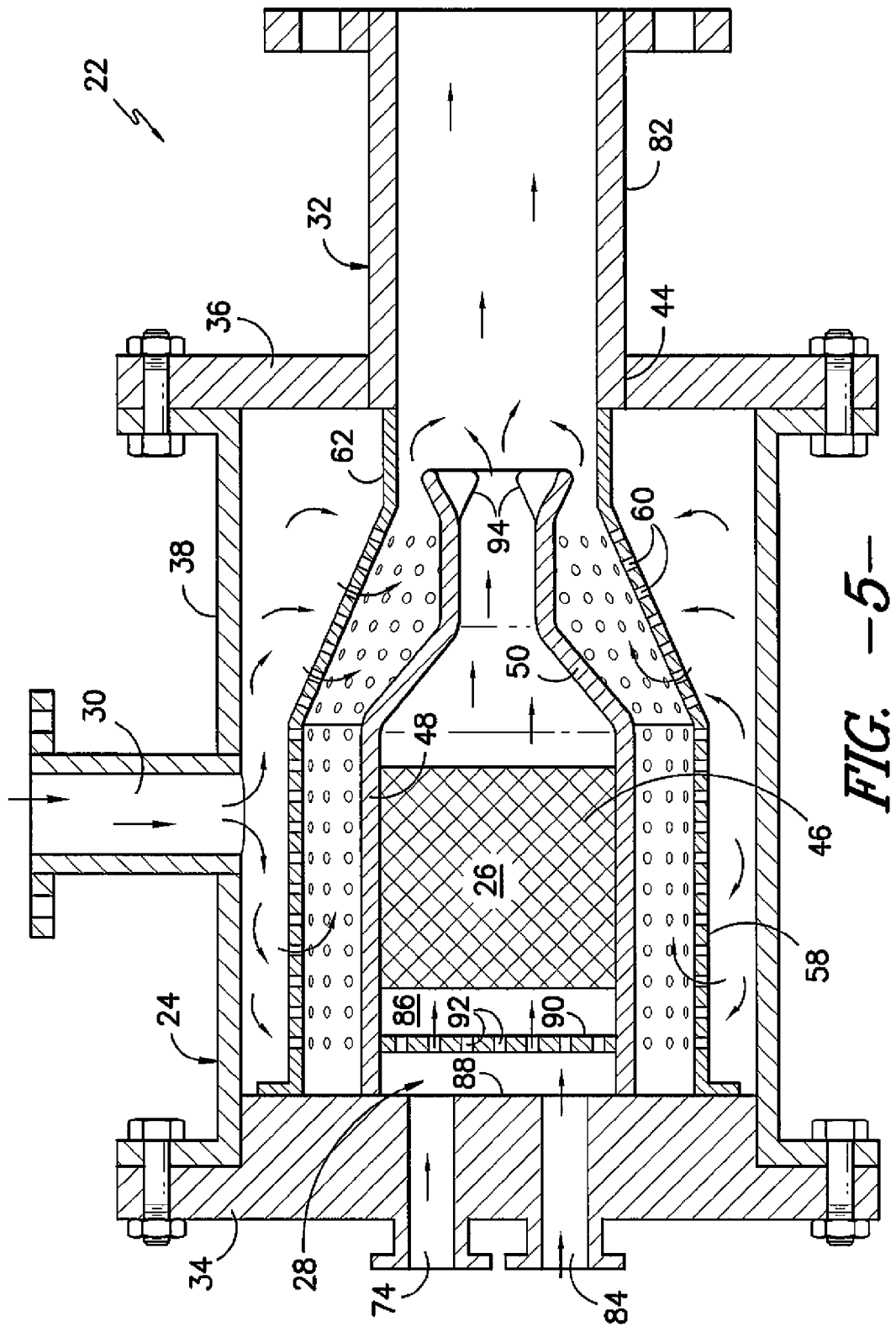
FIG. -5-

FLUID COOLED REFORMER AND METHOD FOR COOLING A REFORMER

RELATED APPLICATIONS

The present application is a divisional application of U.S. application Ser. No, 12/749,985, filed on Mar. 30, 2010, presently U.S. Pat. No. 8,252,251, which is hereby incorporated by reference herein in its entirety for all purposes.

FIELD OF THE INVENTION

The present subject matter relates generally to gas turbine systems and particularly to a fluid cooled reformer for gas turbine systems and a method for cooling both a fuel reformer and the heated reformate stream produced by such fuel reformer.

BACKGROUND OF THE INVENTION

Gas turbines are widely used in commercial operations for power generation. Generally, a gas turbine may include a plurality of combustors disposed in an annular array about the axis of the engine. A compressor supplies compressed air to each combustor, wherein the compressed air and fuel are mixed and burned. Hot gases of combustion flow from each combustor to the turbine section of the engine wherein energy is extracted from the combustion gases to produce work.

Controlling combustor performance is necessary to achieve and maintain satisfactory overall gas turbine operation and to achieve acceptable emission levels, such as NOx levels. It is generally known that increasing the amount of hydrogen present in the air/fuel mixture supplied to the combustors can significantly impact the operation of a gas turbine. For example, the presence of certain amounts of hydrogen within the air/fuel mixture can increase combustion stability and turndown, thereby enabling lower emissions and emissions compliant operation at a lower load.

Fuel reforming systems are known that reform or convert conventional hydrocarbon fuel sources into a hydrogen-rich gas stream. For example, reformers utilizing a partial oxidation reactor, such as a catalytic partial oxidation (CPOX) reactor, are known that partially oxidize an oxygen/fuel mixture to form primarily hydrogen and carbon monoxide. Such reforming systems have traditionally been directed towards the fuel cell market, particularly focusing on producing high quality hydrogen. The reactions that occur during the fuel reforming process are exothermic in nature and, thus, generate high temperature products. For example, the temperature of the hydrogen-rich reformate stream exiting a reactor may exceed 1700 degrees Fahrenheit.

Due to the high temperatures involved in the reforming process, the use of fuel reforming systems within gas turbines has been limited. For example, the temperature of the heated reformate stream produced by the reformer may generally exceed the allowable temperature for the material used to form the pipes in the piping system of a gas turbine. As such, to permit the heated reformate stream to be sent directly into the piping system, high temperatures materials would be required for all downstream piping. Such piping, however, would significantly increase material costs for gas turbines. Additionally, the reformer, itself, generally needs to be cooled to prevent overheating and damage to the reformer components. However, additional cooling systems, such as heat exchangers, add unnecessary complexity and expense.

Accordingly, a fuel reformer that provides for cost effective and relatively simple cooling of the heated reformate stream expelled from the reformer, as well as cooling of the reformer itself, would be welcome in the technology.

BRIEF DESCRIPTION OF THE INVENTION

Aspects and advantages of the invention will be set forth in part in the following description, or may be obvious from the description, or may be learned through practice of the invention.

In one aspect, the present subject matter provides a fluid cooled reformer for gas turbine systems. The fluid cooled reformer includes a pressure vessel and a reactor assembly disposed within the pressure vessel. The reactor assembly may include a reactor and may be configured to receive and reform an oxygen/fuel mixture to produce a heated reformate stream. Additionally, the fluid cooled reformer may include an inlet configured to direct a fluid stream into the pressure vessel. At least a portion of the fluid stream may be used to cool the reactor assembly. A reformate cooling section may be disposed downstream of the reactor of the reactor assembly and may be configured to cool the heated reformate stream.

In another aspect, the present subject provides a method for cooling both a fuel reformer and a heated reformate stream produced by such fuel reformer. The method includes directing a fluid stream around a reactor assembly of a fuel reformer to cool the reactor assembly, wherein the reactor assembly is configured to produce a heated reformate stream, and mixing the heated reformate stream with the fluid stream to cool the heated reformate stream.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which:

FIG. 1 illustrates a schematic diagram of a gas turbine;

FIG. 2 illustrates a cross-sectional side view of an embodiment of a fluid cooled reformer in accordance with an aspect of the present subject matter;

FIG. 3 illustrates a cross-sectional side view of the embodiment of the fluid cooled reformer illustrated in FIG. 2, particularly illustrating a blown-up view of the pressure vessel of the fluid cooled reformer.

FIG. 4 illustrates a cross-sectional side view of another embodiment of a fluid cooled reformer in accordance with an aspect of the present subject matter; and FIG. 5 illustrates a cross-sectional side view of a further embodiment of a fluid cooled reformer in accordance with an aspect of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter provides a fluid cooled reformer for gas turbine systems, as well as a method for cooling both a fuel reformer and the heated reformate stream produced by such reformer. In one embodiment, the present subject matter discloses a fluid cooled reformer that utilizes at least a portion of a fuel stream flowing from the main fuel source of a gas turbine to cool a reactor assembly and a pressure vessel of the fuel reformer. For example, portions of the fuel stream deriving from the main fuel source may be directed over, around and/or adjacent to the reactor assembly to cool the reactor assembly and prevent damage to the fuel reformer due to overheating. Additionally, the fuel stream may also be used to cool the heated reformate stream produced by the reactor assembly. For instance, the fuel stream may be mixed with the heated reformate stream to lower the overall temperature of the reformate to an acceptable level such that the fuel/reformate mixture may be piped downstream utilizing low cost, low temperature piping materials. As such, a cost efficient in-line fuel reforming process may be provided within a gas turbine to produce a hydrogen-rich fuel stream, which may, itself, provide numerous operability benefits. For example, increased hydrogen levels within the fuel stream can provide improved flame stability during low NOx operation, lower emissions and increased turndown. Additionally, the reforming process may result in an increased fuel temperature, which can enhance combustion efficiency and results in a change in Wobbe number. Additionally, an in-line fuel reformer may permit fuel reactivity to be controlled, which can lead to greater fuel flexibility.

It should be readily appreciated that, although the fluid cooled reformer of the present subject matter is generally described herein as utilizing a fuel stream for cooling purposes, the reactor assembly of the reformer, as well as the heated reformate stream, may be cooled with any suitable fluid stream. For example, in one embodiment, steam may be directed into the reformer through an inlet to provide cooling for the reactor assembly. Moreover, the steam may also be mixed with the heated reformate stream exiting the reactor assembly to provide cooling for the reformate stream. In an alternative embodiment, a diluent stream, such as a nitrogen diluent stream, may be directed into the reformer of the present subject matter to cool both the reactor assembly and the heated reformate stream. Further, one of ordinary skill in the art should appreciate that various other fluids may be utilized within the scope of the present subject matter to cool the reactor assembly, as well as the heated reformate stream.

Referring to the drawings, FIG. 1 illustrates a schematic diagram of a gas turbine 10. The gas turbine 10 may include a compressor section 12, a plurality of combustors forming a combustor section 14, and a turbine section 16. The compressor section 12 and turbine section 16 may be coupled by a shaft 18. The shaft 18 may be a single shaft or a plurality of shaft segments coupled together to form the shaft 18. During operation, the compressor section 12 supplies compressed air to the combustor section 14 and a main fuel source 20 supplies a main fuel stream to the combustor section 14. The air and fuel is mixed and burned within each combustor and hot gases of combustion flow from the combustor section 14 to the turbine section 16, wherein energy is extracted from the combustion gases to produce work. Additionally, in accordance with an embodiment of the present subject matter, a fluid cooled reformer 22 may be disposed upstream of the combustor section 14, such as upstream of the fueling manifold (not illustrated) to reform a portion of the main fuel stream to produce a hydrogen-rich reformate stream. This hydrogen-rich reformate stream may then be mixed with the remainder of the main fuel stream and piped to the combustor section 14 for combustion. Further, as will be described in greater detail below in reference to several embodiments of the present subject matter, the unreformed portion of the main fuel stream, generally described herein as the bulk fuel stream, may be utilized to cool the fuel reformer 22 prior to mixing the unreformed fuel with the reformate stream.

In accordance with aspect of the present subject matter, FIGS. 2 and 3 illustrate one embodiment of a fluid cooled reformer 22 for a gas turbine system. Generally, the fluid cooled reformer 22 includes a pressure vessel 24 and a reactor assembly 26 disposed within the pressure vessel 24. The reactor assembly 26 may generally include a reactor 46 and a reactor liner 48. Additionally, the reactor assembly 26 may be configured to receive a mixture of oxygen containing gas and fuel and reform the mixture to produce a heated reformate stream. A mixing section 28 may be disposed upstream of the reactor 46 and may be configured to mix the oxygen containing gas with the fuel to form an oxygen/fuel mixture. Additionally, the fluid cooled reformer 22 may include an inlet, such as bulk fuel inlet 30, configured to direct a bulk fuel stream into the pressure vessel 24. The bulk fuel stream may be directed over, around and/or adjacent to the reactor assembly 26 in order to cool the reactor assembly 26. Further, a reformate cooling section 32 may be disposed downstream of the reactor 46 and may be configured to cool the heated reformate stream expelled from the reactor assembly 26 with the fluid stream previously used to cool the reactor assembly 26.

The pressure vessel 24 of the fluid cooled reformer 22 may generally include a forward end 34, an aft end 36, and a peripheral surface 38 disposed between the forward end 34 and the aft end 36. The forward end 34 of the pressure vessel 24 may generally define one or more openings or passageways to permit a stream of oxygen containing gas, a stream of fuel, or a mixture of both to flow into the pressure vessel 24. For example, as shown in FIGS. 2 and 3, the forward end 34 may define an oxygen/fuel passageway 42 configured to receive a premixer tube 56 of the mixing section 28 such that an oxygen/fuel mixture may be directed into the pressure vessel 24. Additionally, the aft end 36 of the pressure vessel 24 may define at least one outlet 44 for expelling the heated reformate stream exiting the reactor assembly 26 and the bulk fuel stream flowing around the reactor assembly 26 from the pressure vessel 24. Further, the peripheral surface 38 of the pressure vessel 24 may disposed between the forward and aft ends 34,36 so as to generally define the sides or walls of the pressure vessel 24. For instance, as depicted in FIGS. 2 and 3, the peripheral surface 38 may be mounted to the forward and aft ends 34,36 and seals (not illustrated) may be disposed at the interface between the peripheral surface 38 and the ends 34,36 to prevent leakage from the pressure vessel 24.

It should be appreciated that, although the pressure vessel 24 is generally depicted as being cylindrical in shape, the pressure vessel 24 may generally have any suitable shape. For example, the pressure vessel 24 may be rectangular and include a peripheral surface 38 disposed between the forward and aft ends 34,36 so as to define the four sides or walls of the pressure vessel 24. Additionally, it should also be appreciated that, due to the exothermic nature of the reactions occurring within the reactor assembly 26, the pressure vessel 24 may be adapted to withstand high temperatures. Thus, one of ordinary skill in the art should appreciate that the pressure vessel 24 may be formed from a high temperature material capable of withstanding the temperatures produced during the reforming process. For example, the pressure vessel 24 may be formed from a high temperature ceramic.

As indicated above, the reactor assembly 26 of the present subject matter may be disposed within the pressure vessel 24 and may be configured to receive and reform the oxygen/fuel mixture flowing from the mixing section 28 of the fluid cooled reformer 22. Additionally, the reactor assembly 26 may include a reactor 46 and a reactor liner 48. The reactor 46 may generally comprise any suitable fuel reactor known in the art that is configured to convert or reform a fuel stream to produce a heated reformate stream rich in hydrogen. In an exemplary embodiment, the reactor 46 may comprise a catalytic partial oxidation (CPOX) reactor for reforming the oxygen/fuel mixture flowing from the mixing section 28 to produce, primarily, hydrogen and carbon monoxide. For example, the CPOX reactor may be configured to partially reform a small fraction of the fuel flowing from the main fuel source 20 in an exothermic process with oxygen to produce a hydrogen-rich, heated reformate stream. The heated reformate stream may then be mixed with the unreformed, bulk fuel stream and piped downstream to the combustor section 14 of the gas turbine 10 to improve flame stability, lower emissions and increase turndown.

The reactor liner 48 of the reactor assembly 26 may generally surround the reactor 46 in order to contain the high temperature products formed by the exothermic reactions occurring within the reactor 46. Additionally, the reactor liner 48 may be configured to direct the heated reformate stream produced by such reactions into the reformate cooling section 32 of the fluid cooled reformer 22. Thus, as shown in FIG. 3, the reactor liner 48 may have a converging section 50 for directing the heated reformate stream into the reformate cooling section 32. It should be appreciated that, similar to the pressure vessel 24, the reactor liner 48 may be generally adapted to withstand the high temperatures produced by the exothermic reforming process and, thus, may be made of any suitable high temperature material, such as a high temperature ceramic.

As indicated above, the mixing section 28 of the fluid cooled reformer 22 may be disposed upstream of the reactor 46. Generally, the mixing section 28 may be configured to mix an oxygen containing gas with fuel to form an oxygen/fuel mixture. Thus, as shown in FIG. 2, the mixing section may be in flow communication with an oxygen source 52 and a fuel source 54. In an exemplary embodiment, the oxygen containing gas comprises air. As such, the compressor section 12 of a gas turbine 10 may serve as the oxygen source 52 for the mixing section 28. For example, a portion of the pressurized air exiting the compressor (not illustrated) of the compressor section 12 may be diverted from the main air flow and piped, or otherwise supplied, to the mixing section 28. In such an embodiment, an additional compressor (not illustrated), such as a boost compressor, may be disposed upstream of the mixing section 28 to further pressurize the air flowing from the compressor section 12 and/or to compensate for any pressure losses occurring within the pipes. Additionally, in an exemplary embodiment, the main fuel source 20 for the gas turbine may serve as the fuel source 54 for the mixing section 28. Thus, in one embodiment, a fraction of the main fuel stream flowing from the main fuel source 20 may be diverted into the mixing section 28 to be mixed with air deriving from the compressor section 12 to form an oxygen/fuel mixture.

The oxygen/fuel mixture may then be directed into the reactor assembly 26 to activate the reforming process. However, one of ordinary skill in the art should appreciate that the fuel directed into the mixing section 28 need not derive from the main fuel source 20 of the gas turbine 10. For example, in an alternative embodiment, a secondary fuel supply may serve as the fuel source 54 for the mixing section 28. Additionally, it should be appreciated that the oxygen containing gas flowing into the mixing section 28 may originate from a source other than the compressor section 12, such as a secondary or external air source.

The mixing section 28 may generally have any configuration for facilitating the mixing of the oxygen containing gas and the fuel supplied to the mixing section 28. In one embodiment, shown in FIG. 2, the mixing section 28 may include a premixer tube 56 extending outwardly from the forward end 34 of the pressure vessel 24. The premixer tube 56 may be in flow communication with the oxygen source 52 and the fuel source 54 such that the oxygen containing gas and fuel may be mixed in the premixer tube 56 to form an oxygen/fuel mixture. Thus, it should be appreciated that the premixer tube 56 may generally have any suitable size, length or mixing feature to permit the oxygen containing gas and fuel to be sufficiently mixed prior to being directed into the reactor assembly 26. Additionally, as is illustrated in FIGS. 2 and 3, the premixer tube 56 may be received in the oxygen/fuel passageway 42 formed in the forward end 34 of the pressure vessel 24. As such, the oxygen/fuel mixture may flow directly from the premixer tube 56 into the reactor assembly 26. In an alternative embodiment, the premixer tube 56 may be mounted, welded, or otherwise secured to the outer face 40 of the forward end 34 of the pressure vessel 24. In such an embodiment, the oxygen/fuel mixture exiting the premixer tube 56 may flow through the oxygen/fuel passageway 42 formed in the forward end 34 before flowing into the reactor assembly 26 for reforming.

Still referring to FIGS. 2 and 3, the fluid cooled reformer 22 may also include an inlet for directed a fluid steam into the pressure vessel. In one embodiment, the reformer 22 may include a bulk fuel inlet 30 for directing a bulk fuel stream into the pressure vessel 24. As shown, the bulk fuel inlet 30 may be defined in the peripheral surface 38 of the pressure vessel 24 to permit the fuel stream to enter the pressure vessel 24. However, it should be appreciated that, in alternative embodiments, the bulk fuel inlet 30 may be defined in the forward end 34 or the aft end 36 of the pressure vessel 24. Additionally, it should be appreciated that the bulk fuel stream may comprise a portion or all of the main fuel stream supplied from the main fuel source 20. For example, in the embodiment of FIGS. 2 and 3, the bulk fuel stream may comprise the main fuel stream less the fraction of fuel being diverted from the main fuel stream and directed to the mixing section 28 of the fluid cooled reformer 22.

The bulk fuel stream flowing into the pressure vessel 24 may serve numerous functions. For example, the bulk fuel stream may be at a relatively low temperature, particularly in comparison to the temperatures of the surface(s) and/or liner(s) of the pressure vessel 24 and reactor assembly 26. Thus, the bulk fuel stream may be utilized to cool both the pressure vessel 24 and the reactor assembly 26. For example, the bulk fuel stream may be directed over, around and/or adjacent to the reactor liner 48 to cool the reactor assembly 26. In particular, in one embodiment, the bulk fuel stream may be directed around the reactor assembly 26 so as to contact the reactor liner 48 and permit heat to transfer by conduction between the liner 48 and the fuel stream. Additionally, the bulk fuel stream may be used to cool the heated reformate stream exiting the reactor assembly 26. For example, the bulk fuel stream may be mixed with the heated reformate stream to reduce the temperature of the reformate to a temperature that can be withstood by downstream piping. However, it should be appreciated that fluid streams, other than the bulk fuel stream, may be directed into the pressure vessel 24 to provide cooling. For example, in alternative embodiments, a stream of steam or a diluent stream, such as a nitrogen diluent stream, may be directed through an inlet and into the pressure vessel 24 to cool the reactor assembly 26 and the heated reformate stream.

To facilitate cooling of the reactor assembly 26, the fluid cooled reformer 22 may also include an impingement sleeve 58. As particularly shown in FIG. 3, the impingement sleeve 58 may be disposed within the pressure vessel 24 and may be adjacent to and at least partially surround the reactor liner 48 of the reactor assembly 26. As such, the impingement sleeve 58 may be generally configured to distribute the bulk fuel stream over, around and/or adjacent to the reactor liner 48 to cool the reactor assembly 26. Thus, a plurality of impingement holes 60 may be formed in the impingement sleeve 58 to permit the bulk fuel stream to flow through the sleeve 58 and impinge on the reactor liner 48. It should be appreciated that the location, size, and amount of impingement holes 60 formed in the impingement sleeve 58 may be varied to modify or enhance the cooling effect of the bulk fuel stream. Moreover, a flow directing wall 64 may be disposed within the pressure vessel 24 to define a flowpath for the bulk fuel stream flowing into the pressure vessel 24. Thus, as indicated by the arrows in FIG. 3, the bulk fuel stream entering the pressure vessel 24 through the bulk fuel inlet 30 may flow into and around the flow directing wall 64 and then over and through the impingement sleeve 58 to permit the bulk fuel stream to impinge on the reactor liner 48. Additionally, one of ordinary skill in the art should appreciate that any suitable heat transfer feature may also be disposed on the exterior surface of the rector liner 48 to enhance heat transfer from the reactor assembly 26 to the bulk fuel stream. For example, in one embodiment, cooling fins (not illustrated) may be disposed along the reactor liner 48 to improve the cooling performance of the bulk fuel stream.

Further, a small fraction of the bulk fuel stream flowing through the pressure vessel 24 may be directed between the reactor assembly 26 and the forward end 34 of the pressure vessel 24. For example, as shown in FIG. 3, the reactor assembly 26 may be mounted to the forward end 34 of the pressure vessel 24 such that the reactor assembly 26 is spaced apart from the forward end 34. As such, a cavity 66 may be defined between the reactor assembly 26 and forward end 34. Accordingly, as is illustrated by the arrows, a fraction of the bulk fuel stream may be directed into the cavity 66 to cool the forward end 34 of the pressure vessel 24 and any adjacent portions of the reactor assembly 26.

The fluid cooled reformer 22 of the present subject matter also includes a reformate cooling section 32 disposed downstream of the reactor 46. The reformate cooling section 32 may generally be configured to cool the heated reformate stream exiting the reactor assembly 26 with the bulk fuel stream flowing over, around, and/or adjacent to the reactor assembly 26. For example, the reformate cooling section may be configured to mix the bulk fuel stream with the heated reformate stream to cool the heated reformate stream to a temperature that can be withstood by any downstream piping.

In one embodiment, shown in FIG. 2, the reformate cooling section 32 may generally comprise a cooling tube 68 and a cooling sleeve 70. The cooling sleeve 70 may be disposed substantially within the cooling tube 68 and may be generally configured to receive the heated reformate stream expelled from the reactor 46. Additionally, as illustrated in FIGS. 2 and 3, the cooling sleeve 70 may form an extension of the reactor liner 48. Thus, the heated reformate stream exiting the reactor 46 may flow through the converging section 50 of the reactor liner 48 and into the cooling sleeve 70. In alternative embodiments, however, it should be appreciated that the cooling sleeve 70 may be secured to the reactor liner 48 as a separate component.

The cooling sleeve 70 may also be utilized to shield the impingement sleeve 58 and the cooling tube 68 from the high temperature reformate stream. Thus, the cooling sleeve 70 may contain the heated reformate stream until the reformate has been sufficiently cooled and a safe operating temperature is achieved. For example, as shown in FIG. 2, the cooling sleeve 70 may extend substantially throughout the entire length of the cooling tube 68 to shield the cooling tube 68 from the high temperature reformate. Further, a plurality of cooling holes 71 may be formed in the cooling sleeve 70 to permit a portion of the bulk fuel stream flowing around the cooling sleeve 70 to be injected into the heated reformate stream to mix with and lower the temperature of the reformate. One of ordinary skill in the art should appreciate that the size, amount, and location of the cooling holes 71 formed in the cooling sleeve 70 may generally vary depending on the configuration of the reformate cooling section 32 and the cooling performance desired.

Referring to FIGS. 2 and 3, the cooling tube 68 may be generally received in the outlet 44 defined the aft end 36 of the pressure vessel 24 such that the heated reformate stream and the bulk fuel stream may be expelled from the pressure vessel 24. Additionally, the cooling tube 68 may extend into the pressure vessel 24 and engage a downstream end 62 of the impingement sleeve 58. As such, the portion of the bulk fuel stream not injected into the heated reformate stream through the cooling holes 71 may be directed between the cooling tube 68 and the cooling sleeve 70 to cool the cooling sleeve 70 and further cool the heated reformate stream. This portion of the bulk fuel stream may then be mixed with the bulk fuel/reformate mixture flowing through the cooling sleeve 70 to further lower the temperature of the mixture. This cooled, reformed fuel mixture may then be piped downstream to the combustor section 14 of the gas turbine 10.

It should be appreciated that the length and/or other dimensions of the cooling tube 68 may generally vary depending on the configuration of the reformate cooling section 32 and the desired cooling performance. Additionally, it should be appreciated that the cooling tube 68 may be in sliding engagement with the impingement sleeve 58 to accommodate thermal growth of the impingement sleeve 58 due to the high temperatures involved in the reforming process. Thus, as shown in FIG. 3, the cooling tube 68 may include a notched end 72 to permit the downstream end 62 of the impingement sleeve 58 to slide relative to the cooling tube 68.

During operation of the fluid cooled reformer 22 in accordance with the embodiment illustrated in FIGS. 2 and 3, a fraction of the main fuel stream from the main fuel source 20 may be diverted to the mixing section 28 of the fluid cooled reformer 22 to be mixed with an oxygen containing gas. The remainder of the fuel from the main fuel stream, constituting the bulk fuel stream, may be directed into the bulk fuel inlet 30 defined in the pressure vessel 24. The oxygen/fuel mixture flowing from the mixing section 28 may be received in the reactor assembly 26, wherein the mixture undergoes an exothermic reaction to produce a heated reformate stream rich in hydrogen. To provide cooling for the reactor assembly 26, the bulk fuel stream flowing into the bulk fuel inlet 30 may be directed over, around and/or adjacent to the reactor liner 48. After cooling the reactor assembly 26, the bulk fuel stream may be directed into the reformate cooling section 32, wherein the bulk fuel stream may be used to cooled the heated reformate stream. In particular, a portion of the bulk fuel stream may be injected into and mixed with the heated reformate stream. The remainder of the bulk fuel stream may flow around the cooling sleeve 70 of the reformate cooling section 32 to cool the cooling sleeve 70 and provide further cooling for the reformate stream. The cooled, hydrogen rich fuel stream flowing from the fluid cooled reformer 22 may then be directed downstream to one or more combustors within the combustor section 14 of the gas turbine 10.

It should be appreciated that an additive may be added to the bulk fuel stream or the hydrogen rich fuel steam exiting the fluid cooled reformer 22. For example, steam or a diluent, such as a nitrogen diluent, may be added to the bulk fuel stream prior to the fuel stream being directed into the pressure vessel 24. This additive may be included, for example, to dilute the bulk fuel stream so as to abate combustion of the fuel within the pressure vessel 24. Additionally, steam or a diluent may be added to the hydrogen rich fuel stream to provide further cooling for the fuel stream.

Further, in one embodiment, the fuel diverted from the main fuel stream to undergo the reforming process may be preheated prior to being directed into the mixing section 28. For example, the fuel may be diverted through a pipe (not illustrated) disposed adjacent to the peripheral surface 38 of the pressure vessel 24 such that heat is transferred from the pressure vessel 24 to the pipe to preheat the fuel.

Referring now to FIG. 4, an alternative embodiment of a fluid cooled reformer 22 is illustrated in accordance with another aspect of the present subject matter. Similar to the embodiment illustrated in FIGS. 2 and 3, the fluid cooled reformer 22 includes a pressure vessel 24 and a reactor assembly 26 disposed within the pressure vessel 24. The reactor assembly 26 may be configured to receive an oxygen/fuel mixture and reform the mixture to produce a heated reformate stream. A mixing section 28 may be disposed upstream of the reactor 46 of the reactor assembly 26 and may be configured to mix an oxygen containing gas with fuel to form the oxygen/fuel mixture. Additionally, the fluid cooled reformer 22 may include an inlet, such as bulk fuel inlet 30, configured to direct a bulk fuel stream into the pressure vessel 24. The bulk fuel stream may be directed over, around, and/or adjacent to the reactor assembly 26 in order to cool the reactor assembly 26. Further, a reformate cooling section 32 may be disposed downstream of the reactor 46 and may be configured to cool the heated reformate stream expelled from the reactor assembly 26 with the bulk fuel stream previously used to cool the reactor assembly 26.

As described above, the pressure vessel 24 may include a forward end 34, an aft end 36 and a peripheral surface 38 disposed between the forward and aft ends. Additionally, as shown in FIG. 4, the forward end 34 of the pressure vessel 24 may define an oxygen passageway 74 for directing an oxygen containing gas into the pressure vessel 24. In particular, the oxygen passageway 74 may be in flow communication with an oxygen source 52 (FIG. 2), such as the compressor section 12 of a gas turbine 10, to permit an oxygen containing gas, such air, to be directed into the pressure vessel 24. Additionally, the forward end 34 of the pressure vessel 24 may also include an inwardly extending projection 76. As shown in FIG. 4, the impingement sleeve 58 may extend from an outer surface 78 of the projection 76. For example, the impingement sleeve 58 may be secured to or formed integral with the projection 76. Further, the reactor liner 48 of the reactor assembly 26 may be secured to or formed integral with an end of the projection 76.

The inwardly extending projection 76 of the forward end 34 of the pressure vessel 24 may generally define the mixing section 28 of the fluid cooled reformer 22. In particular, a plurality of fuel injection ports 80 may be formed in the projection 76. The fuel injection ports 80 may be configured to inject a portion of the bulk fuel stream flowing through the pressure vessel 24 into the flow of the oxygen containing gas supplied through the oxygen passageway 74. For example, in one embodiment, a majority of the bulk fuel stream may impinge through the impingement sleeve 58 and onto the reactor liner 48, while a fraction of the bulk fuel stream is directed through the fuel injection ports 80. The fuel flowing through the injection ports 80 may then be injected into and mixed with the oxygen containing gas to form an oxygen/fuel mixture. The oxygen/fuel mixture may then be directed from the mixing section 28 and into to the reactor assembly 26 to be reformed. It should be readily appreciated that the size and amount of injection ports 80 formed in the projection 76 may be varied depending on the desired portion of the fuel from the bulk fuel stream that will be reformed by the reactor 46.

Moreover, in the embodiment illustrated in FIG. 4, the reformate cooling section 32 of the fluid cooled reformer 22 may be generally defined by the aft end 36 of the pressure vessel 24. For example, as is illustrated, the aft end 36 of the pressure vessel 24 may include an elongated outlet 82 extending outwardly from the aft end 36. The elongated outlet 82 may be generally configured to receive and mix the heated reformate stream exiting the reactor assembly 26 with the unreformed portion of the bulk fuel stream flowing over, around and/or adjacent to the reactor liner 48. Thus, the heated reformate stream and unreformed portion of the bulk fuel stream may converge at the downstream ends 49,62 of the reactor liner 48 and the impingement sleeve 58, respectively, and flow into the elongated outlet 82, wherein the heated reformate stream is cooled by the bulk fuel stream. It should be readily appreciated that the particular length of the elongated outlet 82 may vary depending on the temperature of the heated reformate stream and the amount of mixing needed to adequately cool the heated reformate stream to a temperature that can be withstood by the downstream piping.

During operation of the fluid cooled reformer 22 in accordance with the embodiment illustrated in FIG. 4, an oxygen containing gas may be supplied into the pressure vessel 24 through an oxygen passageway 74 defined by the forward end 34 of the pressure vessel 24. Additionally, a bulk fuel stream may be directed into the bulk fuel inlet 30 of the pressure vessel 24. As the bulk fuel stream flows into the pressure vessel 24, a portion of the bulk fuel stream may be directed into the mixing section 28. In particular, a portion of the bulk fuel stream may flow through fuel injection ports 80 defined in the forward end 34 of the pressure vessel 24 and may be injected into the oxygen passageway 74 so as to be mixed with the oxygen containing gas to form an oxygen/fuel mixture. The oxygen/fuel mixture flowing from the mixing section 28 may be directed into the reactor assembly 26, wherein the mixture undergoes an exothermic reaction to produce a heated reformate stream rich in hydrogen. To provide cooling for the reactor assembly 26, the remainder of the bulk fuel stream may be directed over, around and/or adjacent to the reactor liner 48. This unreformed portion of the bulk fuel stream may then be directed into the reformate cooling section 32, wherein the bulk fuel stream may be utilized to cool the heated reformate stream flowing from the reactor 46. In particular, the heated reformate stream may be mixed with the unreformed portion of the bulk fuel stream to lower the temperature of the heated reformate stream. This cooled, hydrogen-rich fuel stream may then be piped downstream to one or more combustors within the combustor section 14 of a gas turbine 10.

In accordance with another aspect of the present subject matter, FIG. 5 illustrates a further embodiment of a fluid cooled reformer 22. Similar to the embodiments illustrated in FIGS. 2-4, the fluid cooled reformer 22 includes a pressure vessel 24 and a reactor assembly 26 disposed within the pressure vessel 24. The reactor assembly 26 may be configured to receive an oxygen/fuel mixture and reform the mixture to produce a heated reformate stream. A mixing section 28 may be disposed upstream of the reactor 46 of the reactor assembly 26 and may be configured to mix an oxygen containing gas with fuel to form the oxygen/fuel mixture. Additionally, the fluid cooled reformer 22 may include an inlet, such as bulk fuel inlet 30, configured to direct a bulk fuel stream into the pressure vessel 24. The bulk fuel stream may be directed over, around, and/or adjacent to the reactor assembly 26 in order to cool the reactor assembly 26. Further, a reformate cooling section 32 may be disposed downstream of the reactor 46 and may be configured to cool the heated reformate stream expelled from the reactor assembly 26 with the bulk fuel stream used to cool the reactor assembly 26.

As described above, the pressure vessel 24 may include a forward end 34, an aft end 36 and a peripheral surface 38 disposed between the forward and aft ends 34,36. Additionally, as shown in FIG. 5, the forward end 34 of the pressure vessel 24 may define an oxygen passageway 74 for directing an oxygen containing gas into the pressure vessel 24 and a fuel passageway 84 for directing fuel into the pressure vessel 24. The oxygen passageway 74 may be in flow communication with an oxygen source 52 (FIG. 2), such as the compressor section 12 of a gas turbine 10, to permit an oxygen containing gas, such as air, to be directed into the pressure vessel 24. Additionally, the fuel passageway 84 may be in flow communication with a fuel source 54 (FIG. 2), such as the main fuel stream flowing from the main fuel source 20, to permit a portion of the fuel from the main fuel stream to be directed into the forward end 34 of the pressure vessel 24.

The oxygen and fuel passageways 74,84 defined in the forward end 34 of the pressure vessel 24 may be configured to direct the oxygen containing gas and fuel, respectively, into the mixing section 28 of the fluid cooled reformer 22. As shown in FIG. 5, the mixing section 28 may be generally defined by a mixing chamber 86 formed by the reactor liner 48 of the reactor assembly 26 between an inner surface 88 of the forward end 34 of the pressure vessel 24 and the reactor 46. Generally, the mixing chamber 86 may be configured to mix the oxygen containing gas and fuel flowing through the forward end 34 to form an oxygen/fuel mixture. To facilitate mixing of the oxygen containing gas and fuel, a mixing disc 90 may be disposed within the mixing chamber 86. For example, a plurality of mixing holes 92 may be formed in the mixing disc 90 to enhance mixing of the oxygen containing gas and fuel.

Additionally, in the embodiment depicted in FIG. 5, the reformate cooling section 32 of the fluid cooled reformer 22 may be generally defined by the aft end 36 of the pressure vessel 24. For example, similar to the embodiment illustrated in FIG. 4, the aft end 36 of the pressure vessel 24 may include an elongated outlet 82 extending outward from the aft end 36. The elongated outlet 82 may be generally configured to receive and mix the heated reformate stream exiting the reactor assembly 26 with the bulk fuel stream flowing over, around and/or adjacent to the reactor liner 48. However, in addition to the elongated outlet 82, the reformate cooling section 32 may also include at least one mixing element configured to enhance mixing of the heated reformate stream and the bulk fuel stream to provide further cooling for the heated reformate stream. For example, as shown in FIG. 5, the mixing element may comprise a diverging lobe structure 94 extending outwardly from the reactor liner. The lobe structure 94 may be configured to introduce turbulence into the heated reformate stream and the bulk fuel stream to facilitate mixing as the streams converge and flow into the elongated outlet 82. It should be appreciated that the lobe structure 94 may form part of the reactor liner 48 or may be secured to the reactor liner 48 as a separate component, such as by welding. Additionally, one of ordinary skill in the art should appreciate that other suitable mixing elements may be utilized within the scope of the present subject matter to further enhance cooling of the heated reformate stream. For example, cooling fins (not illustrated) may be formed on the reactor liner 48 to introduce turbulence into the bulk fuel stream, the heated reformate stream, or both.

During operation of the fluid cooled reformer 22 in accordance with the embodiment illustrated in FIG. 5, an oxygen containing gas and a portion of the main fuel stream from the main fuel source 20 may directed through the forward end 34 of the pressure vessel 24 and into the mixing chamber 86 of the mixing section 28. Inside the mixing chamber 86, the fuel and oxygen containing gas may be mixed to form an oxygen/fuel mixture. The remainder of the fuel from the main fuel stream, constituting the bulk fuel stream, may be directed into the bulk fuel inlet 30 defined in the pressure vessel 24. The oxygen/fuel mixture flowing from the mixing section 28 may be directed into the reactor assembly 26, wherein the mixture undergoes an exothermic reaction to produce a heated reformats stream rich in hydrogen. To provide cooling for the reactor assembly 26, the bulk fuel stream may be directed over, around and/or adjacent to the reactor liner 48. The bulk fuel stream may then be directed into the reformate cooling section 32, wherein the bulk fuel stream may be used to cooled the heated reformate stream. In particular, the heated reformate stream may be mixed with the bulk fuel stream to lower the temperature of the heated reformate stream. A mixing element, such as lobe structure 94, may be included in the reformate cooling section 32 to enhance cooling of the heated reformate stream. The cooled, hydrogen-rich fuel stream may then be piped downstream to one or more combustors within the combustor section 14 of the gas turbine 10.

It should be appreciated that, in alternative embodiments of the present subject matter, the fluid stream used to cool the reactor assembly 26, such as the bulk fuel stream, may be diverted from the pressure vessel 24 without being mixed with the heated reformate stream. In such embodiments, the heated reformate stream may be cooled by another source, such as a downstream heat exchanger, prior to being mixed with the bulk fuel stream.

It should also be appreciated that the present subject matter also provides a method for cooling both a fuel reformer 22 and a heated reformate stream produced by such fuel reformer 22. The method generally includes directing a fluid stream, such as a bulk fuel stream, steam stream, or a diluent stream, around a reactor assembly 26 of a fuel reformer 22 to cool the reactor assembly 26, wherein the reactor assembly 26 is configured to produce a heated reformate stream, and mixing the heated reformate stream with the fluid stream to cool the heated reformate stream.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a fuel reformer, the method comprising:
   directing a fluid stream around a reactor assembly of said fuel reformer to cool said reactor assembly, wherein said reactor assembly is configured to produce a heated reformate stream; and
   mixing said heated reformate stream with said fluid stream to cool said heated reformate stream.

2. The method of claim 1, wherein said fluid stream comprises an unreformed fuel stream.

3. The method of claim 2, further comprising adding at least one of steam or a diluent to the mixture of said heated reformate stream and said unreformed fuel stream to further cool said heated reformate stream.

4. The method of claim 2, wherein said unreformed fuel is supplied from a fuel source of a gas turbine.

5. The method of claim 1, further comprising directing said fluid stream through an impingement sleeve at least partially surrounding said reactor assembly.

6. The method of claim 1, further comprising:
   mixing an oxygen-containing gas with fuel to form an oxygen/fuel mixture;
   directing said oxygen/fuel mixture into said reactor assembly, said reactor assembly being configured to reform said oxygen/fuel mixture to produce said heated reformate stream.

7. The method of claim 1, wherein mixing said heated reformate stream with said fluid stream to cool said heated reformate stream comprises mixing said heated reformate stream with said fluid stream at a downstream end of said reactor assembly.

8. The method of claim 1, further comprising:
   directing said heated reformate stream through a cooling sleeve extending from a downstream end of said reactor assembly; and
   injecting said fluid stream through said cooling sleeve to mix said heated reformate stream with said fluid stream.

9. The method of claim 1, wherein said reactor assembly is spaced apart from a pressure vessel of said fuel reformer such that a cavity is defined between said reactor assembly and a forward end of said pressure vessel, further comprising directing at least a portion of said fluid stream into said cavity.

10. The method of claim 1, wherein said reactor assembly comprises a catalytic partial oxidation reactor.

* * * * *